(12) United States Patent
Ramesh

(10) Patent No.: US 9,344,527 B2
(45) Date of Patent: May 17, 2016

(54) SYSTEM AND METHOD FOR NETWORK MIGRATION

(71) Applicant: AVAYA, INC., Basking Ridge, NJ (US)

(72) Inventor: Deepak Ramesh, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 611 days.

(21) Appl. No.: 13/866,007

(22) Filed: Apr. 18, 2013

(65) Prior Publication Data

US 2014/0317227 A1    Oct. 23, 2014

(51) Int. Cl.
*H04J 3/16* (2006.01)
*H04L 29/08* (2006.01)

(52) U.S. Cl.
CPC ........................ *H04L 67/34* (2013.01)

(58) Field of Classification Search
None
See application file for complete search history.

(56) References Cited

U.S. PATENT DOCUMENTS

| | | | | |
|---|---|---|---|---|
| 7,415,535 | B1 * | 8/2008 | Kuik ................... | H04L 61/6004 370/217 |
| 8,452,856 | B1 * | 5/2013 | Lent ...................... | G06F 3/0647 709/219 |
| 9,164,795 | B1 * | 10/2015 | Vincent ................. | G06F 9/4856 |
| 9,197,489 | B1 * | 11/2015 | Vincent ............... | H04L 41/0226 |
| 2003/0097470 | A1 * | 5/2003 | Lapuh .................. | H04L 45/245 709/239 |
| 2004/0114588 | A1 * | 6/2004 | Bhaskaran .............. | H04L 45/74 370/389 |
| 2007/0201469 | A1 * | 8/2007 | Iyer .................... | H04L 29/12028 370/391 |
| 2008/0159309 | A1 * | 7/2008 | Sultan .................. | H04L 12/2852 370/401 |
| 2009/0274044 | A1 * | 11/2009 | Goose ................... | H04L 12/413 370/225 |
| 2009/0282152 | A1 * | 11/2009 | Zhang ..................... | H04L 12/66 709/227 |
| 2011/0206047 | A1 * | 8/2011 | Donthamsetty ..... | H04L 12/4641 370/392 |
| 2011/0310904 | A1 * | 12/2011 | Ger ..................... | H04L 12/4625 370/401 |
| 2013/0212200 | A1 * | 8/2013 | Dennis .................... | H04L 51/22 709/206 |
| 2013/0259046 | A1 * | 10/2013 | Ramesh .................. | H04L 43/12 370/392 |
| 2014/0092913 | A1 * | 4/2014 | Ramesh .................. | H04L 45/66 370/409 |
| 2014/0269719 | A1 * | 9/2014 | Ramesh .............. | H04L 12/4641 370/392 |

* cited by examiner

*Primary Examiner* — Otis L Thompson, Jr.

(57) ABSTRACT

Methods, systems and computer readable media for network migration as described. The method can include receiving, at a processor, an indication to initiate a migrate start. The method can also include initiating, at the processor, a migrate start including forwarding traffic in a first protocol based on a first table while building a second table to forward traffic in a second protocol different from the first protocol. The method can further include performing a migrate cutover when it is determined that one or more MAC addresses for an active session have been learned and stored in the table. The method can also include completing a migration when an indication is received to complete the migration. The method can also include aborting the migration based on a received indication to abort the migration.

18 Claims, 7 Drawing Sheets

SYSTEM AND METHOD FOR NETWORK MIGRATION

TECHNICAL FIELD

Embodiments relate generally to computer networks, and more particularly, to methods, systems and computer readable media for network migration.

BACKGROUND

Migrating a computer network from a legacy technology to a new technology (e.g., migrating from an L2 VLAN-based network to a shortest path bridging Mac-in-Mac (SPBm) VSN network) often affects network services and may even disrupt services. For example, voice or data connections may be dropped as a user is forced to remove a VLAN from the network-to-network interface (NNI) ports before assigning a service identifier (e.g., ISID) to the VLAN.

Embodiments were conceived in light of the above mentioned needs, problems and/or limitations, among other things.

SUMMARY

Some implementations can include a method for network migration. The method can include receiving, at a processor, an indication to initiate a migrate start. The method can also include initiating, at the processor, a migrate start including forwarding traffic in a first protocol (e.g., L2 VLAN MAC learning) based on a first table and building a second table to forward traffic in a second protocol (e.g., ISIS or the like) different from the first protocol. The method can further include performing a migrate cutover when it is determined that one or more MAC addresses for an active session have been learned and stored in the second table. The method can also include completing a migration when an indication is received to complete the migration.

The method can also include aborting the migration based on a received indication to abort the migration. The migrate start can include assigning a VLAN to an ISID and continuing to use VLAN encapsulation. The migrate start can also include advertising a local machine to remote backbone edge bridges using the second protocol, and storing information about the advertised local machine in each remote backbone edge bridge.

The migrate cutover can include confirming that the second table includes machine addresses associated with an active session, and encapsulating and forwarding messages according to the second protocol. The method can also include retaining NNI ports as part of a C-VLAN.

In some implementations, the aborting can include removing a VLAN to ISID mapping, and retaining NNI ports as part of a C-VLAN and clearing the second table in each BEB. The aborting can further include encapsulating and forwarding messages in the first protocol.

In some implementations the completing can include removing NNI ports from a C-VLAN and removing VLAN MAC entries by permitting the VLAN MAC entries to age-out. The completing can further include encapsulating and forwarding traffic using the second protocol.

Some implementations can include a system configured to perform one or more steps of the above-mentioned method. Also, some implementations can include a nontransitory computer readable medium having software instruction stored thereon to cause a processor to perform the method described above.

DETAILED DESCRIPTION

In general, some implementations can include a network migration having four main phases. In phase one, or "Migrate Start," a user is permitted to configure VLAN to ISID mappings without having to remove the NNI ports from the C-VLAN. During the Migrate Start phase, packets are still exchanged using the legacy VLAN and are sent using VLAN encapsulation, not Mac-in-Mac encapsulation.

Also during Migrate Start, the local BEB knows which ports are user-to-network interface (UNI) ports and which are NNI ports. MAC addresses learned on the C-VLAN on the UNI ports are sent to remote BEBs via ISIS TLV messages. Remote BEBs, which are also in the Migrate Start phase, install the MAC address in their respective remote MAC tables as being learned via remote BEB. Similarly, the local BEB will also receive C-MACs from remote BEBs and will populate its remote MAC table.

Further, during Migrate Start, a user (or another system) can be permitted to check the remote MAC tables for accuracy before a migration actually occurs. Once the user (or other system) confirms the required MACs in the remote MAC table as reachable via a correct BEB, the user (or system) can move to the second phase.

In the second phase, or Migrate Cutover, VLAN encapsulated packets will not be sent out of the NNI ports, but instead, Mac-in-Mac encapsulated packets will be sent out of the NNI ports.

In the third phase, or Migrate Complete, NNI ports will be removed from C-VLANs automatically and migration will be complete. From the Migrate Cutover phase, if the user experiences any disruption in services, the user can go back to the legacy VLAN services by entering the fourth phase, or Migrate Abort.

In the Migrate Abort phase, the VLAN to ISID mapping is removed and the remote MAC tables built in the local and remote BEBs are cleared. Using the four step migration method outlined above, network system can be migrated from L2 VLAN to L2 VSN, for example.

Figure 1:
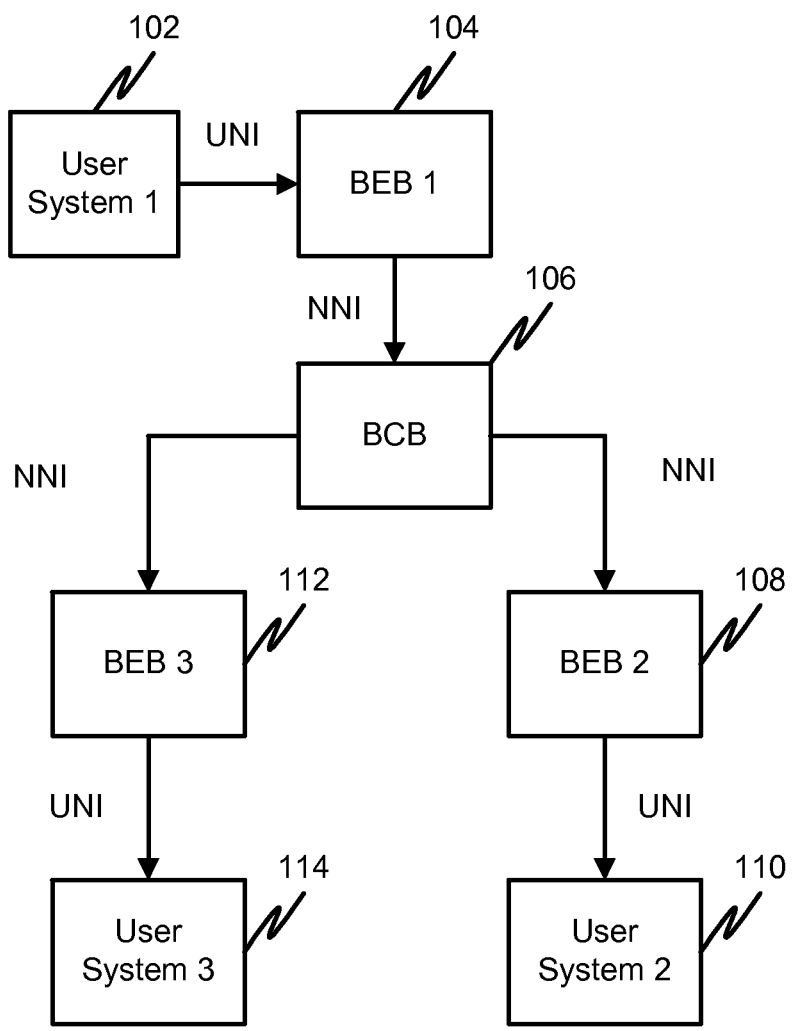
FIG. 1 is a diagram of a network in accordance with at least one embodiment.

FIG. 1 is a diagram of an example network having a plurality of user systems (102, 110 and 114), a plurality of BEBs (104, 108, and 112) and a BCB 106.

Figure 2:
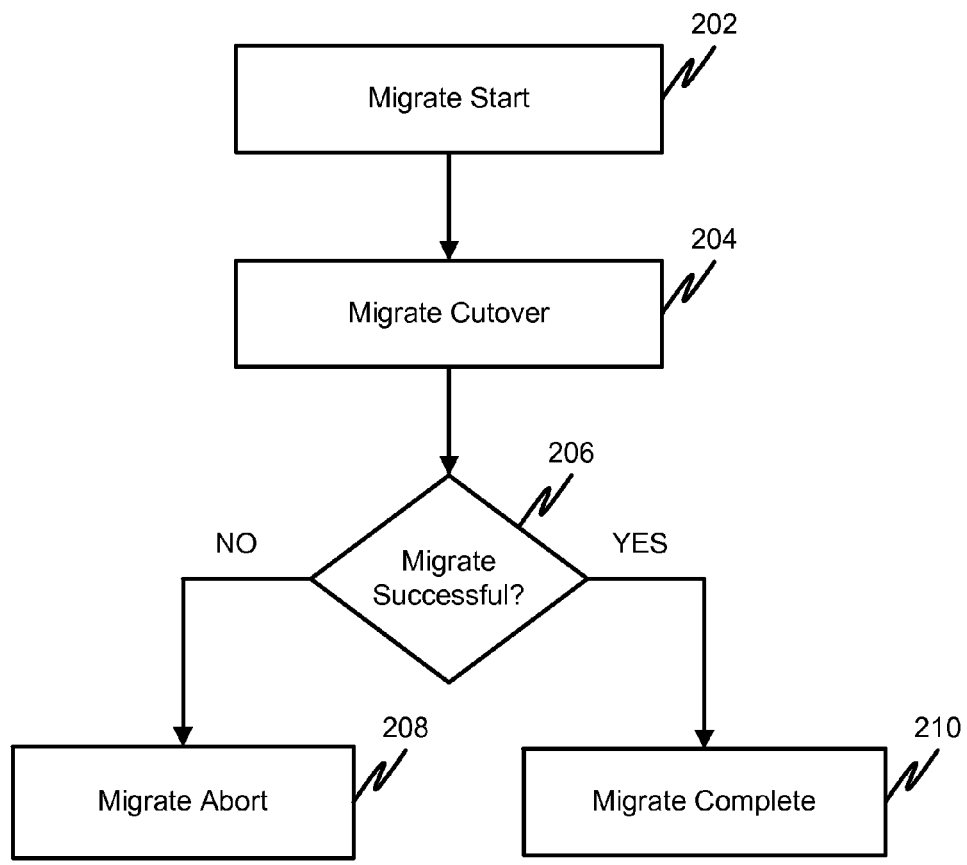
FIG. 2 is a flow chart of an example method for network migration in accordance with at least one embodiment.

FIG. 2 is a flow chart of an example method for network migration. Processing begins at 202 where a migrate start command is received. The migrate start command can be given by a user via a command line interface (CLI) or can be received from another system. Also, the migrate start command can be sent from a network management system via a graphical user interface (GUI). For example, a user could select one or more switches on the GUI and choose the migrate start via a GUI element. Details of the migrate start phase are described below in connection with FIG. 3. Processing continues to 204.

At 204, a migrate cutover phase is executed. Details of the migrate cutover phase are described below in connection with FIG. 4. Processing continues to 206.

At 206, the system determines if the migration was successful. Indications of successful migrations can come from a user or from another system. For example the user or other system could check the VLAN-based MAC table against the ISID MAC table to determine that all MAC addresses of interest were present. If the migration was not successful, processing continues to 208. If the migration was successful, processing continues to 210.

At 208, the system performs migrate abort, which is described below in greater detail in connection with FIG. 5.

At 210, the system performs migrate complete, which is described below in connection with FIG. 6.

Figure 3:
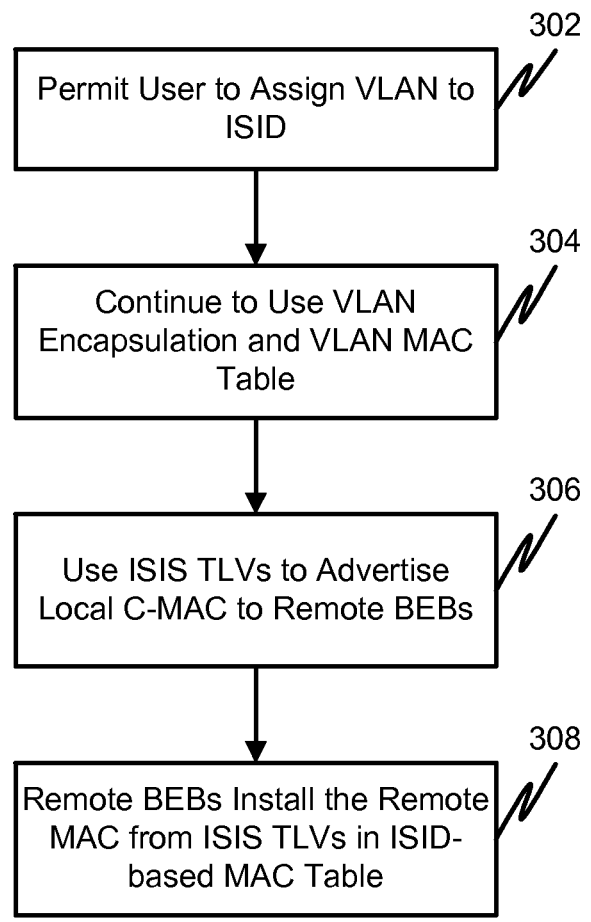
FIG. 3 is a flow chart of an example migration start method in accordance with at least one embodiment.

FIG. 3 is a flow chart of an example migration start method. Processing begins at 302, where a user is permitted to assign a VLAN to an ISID. Processing continues to 304.

At 304, the system continues to use VLAN encapsulation and the VLAN MAC table for forwarding. Processing continues to 306.

At 306, the local BEB (e.g. 104 of FIG. 1) uses ISIS TLV messages to advertise the local C-MAC to remote BEBs (e.g., 108 and 112). As an alternative to or in addition to the ISIS TLV messages, the local MACs can be advertised to remote BEBs by sending L2 pings to remote BEBs CFM CMAC with a source MAC as Local MACs in the C-VLAN using Mac-in-Mac encapsulation only on NNI ports. Processing continues to 308.

At 308, the remote BEBs install the remote MAC from the ISIS TLVs into an ISID-based MAC table.

Figure 4:
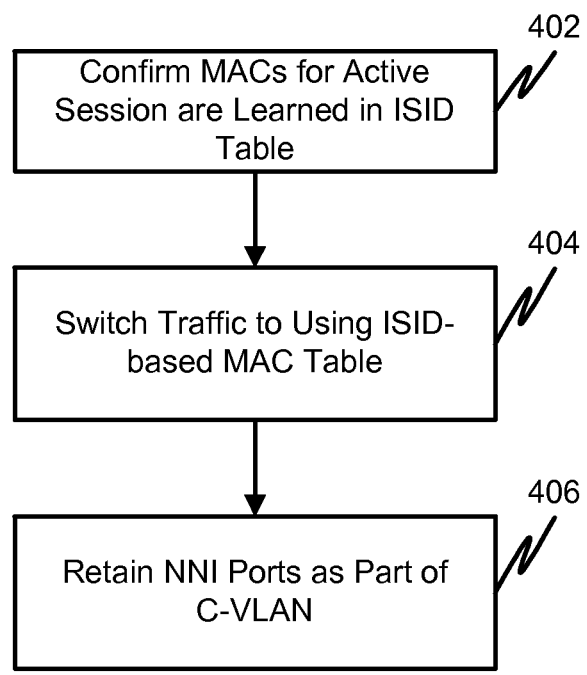
FIG. 4 is a flowchart of an example migration cutover method in accordance with at least one embodiment.

FIG. 4 is a flowchart of an example migration cutover method. Processing begins at 402, where a user (or another system) confirms that the MACs for the active session have been learned in the ISID table. Processing continues to 404.

At 404, once all of the active sessions MACs have been learned, traffic is switched to using an ISID-based MAC table for forwarding. Processing continues to 406.

At 406, the NNI ports are retained as part of the C-VLAN. Also, no UNI copies of the NNI ports are made yet.

Figure 5:
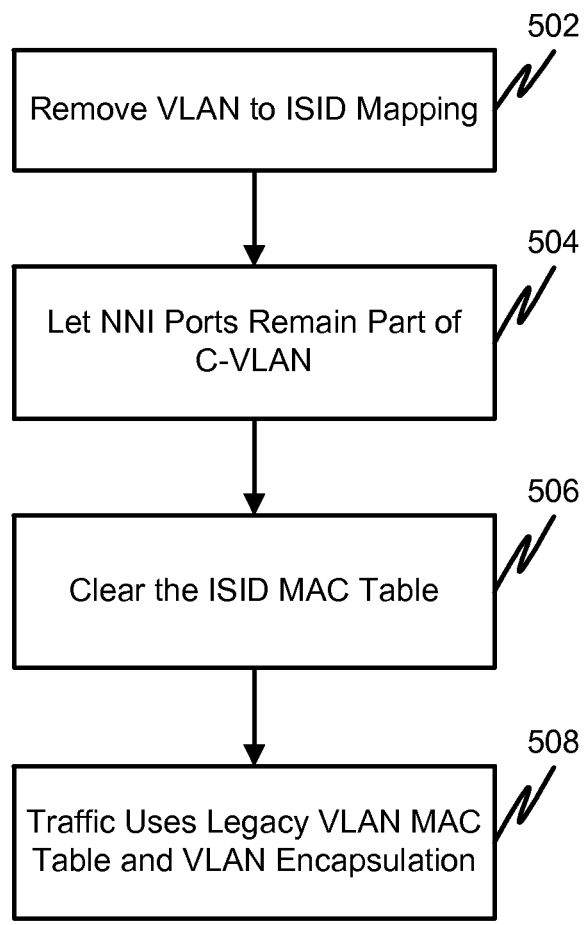
FIG. 5 is a flowchart of an example migration abort method in accordance with at least one embodiment.

FIG. 5 is a flowchart of an example migration abort method. Processing begins at 502, where the VLAN to ISID mapping is removed. Processing continues to 504.

At 504, the NNI ports are retained as part of the C-VLAN. Processing continues to 506.

At 506, the ISID MAC table is cleared. Processing continues to 508.

At 508, traffic uses legacy VLAN MAC table and VLAN encapsulation.

Figure 6:
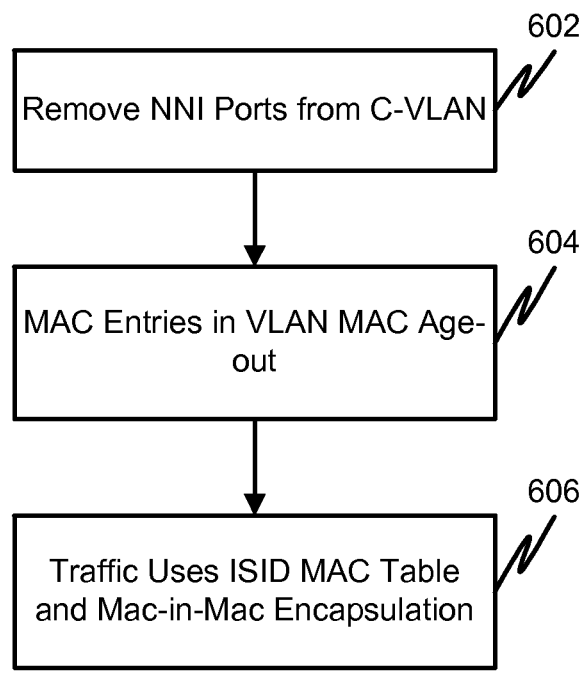
FIG. 6 is a flowchart of an example migration completion method in accordance with at least one embodiment.

FIG. 6 is a flowchart of an example migration completion method. Processing begins at 602, where NNI ports are removed from the C-VLAN. Processing continues to 604.

At 604, MAC entries in the VLAN MAC age-out and are removed. Processing continues to 606.

At 606, traffic is forwarded using the ISID MAC table and Mac-in-Mac encapsulation in accordance with at least one embodiment.

Figure 7:
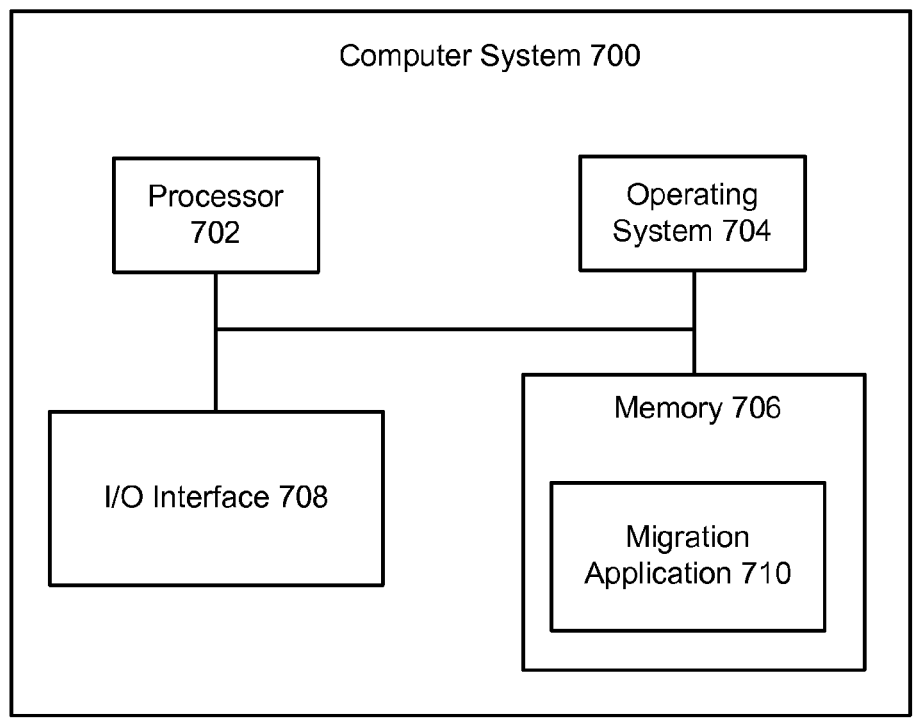
FIG. 7 is a diagram of a computer system in accordance with at least one embodiment.

FIG. 7 is a diagram of an example computer system 700 in accordance with at least one embodiment. The computer system 700 includes a processor 702, operating system 704, memory 706 and I/O interface 708. The memory 706 can include a network migration application 710.

In operation, the processor 702 may execute the application 710 stored in the memory 706. The application 710 can include software instructions that, when executed by the processor, cause the processor to perform operations for network migration in accordance with the present disclosure (e.g., performing one or more of steps 202-210, 302-310, 402-406, 502-508 and/or 602-606 described above).

The application program 710 can operate in conjunction with the operating system 704.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for network migration.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method comprising:
   receiving, at a processor, an indication to initiate a migrate start;
   initiating a migrate start including forwarding traffic in a first protocol based on a first table and building a second table to forward traffic in a second protocol different from the first protocol;
   performing a migrate cutover when it is determined that one or more MAC addresses for an active session have been learned and stored in the second table; and
   completing a migration when an indication is received to complete the migration.

2. The method of claim 1, further comprising aborting the migration based on a received indication to abort the migration.

3. The method of claim 1, wherein the migrate start includes:
   assigning a VLAN to an ISID;
   continuing to use VLAN encapsulation;
   advertising a local machine to remote backbone edge bridges using the second protocol; and
   storing information about the advertised local machine in a second table of each remote backbone edge bridge.

4. The method of claim 1, wherein the migrate cutover includes:
   confirming that the second table includes machine addresses associated with an active session;
   encapsulating and forwarding messages according to the second protocol; and
   retaining NNI ports as part of a C-VLAN.

5. The method of claim 2, wherein the aborting includes:
   removing a VLAN to ISID mapping;
   retaining NNI ports as part of a C-VLAN;
   clearing the second table in each BEB; and
   encapsulating and forwarding messages in the first protocol.

6. The method of claim 1, wherein the completing includes:
   removing NNI ports from a C-VLAN;
   removing VLAN MAC entries by permitting the VLAN MAC entries to age-out; and
   encapsulating and forwarding traffic using the second protocol.

7. A system comprising one or more processors configured to perform operations including:
   receiving, at a processor, an indication to initiate a migrate start;
   initiating a migrate start including forwarding traffic in a first protocol based on a first table and building a second table to forward traffic in a second protocol different from the first protocol;
   performing a migrate cutover when it is determined that one or more MAC addresses for an active session have been learned and stored in the second table; and
   completing a migration when an indication is received to complete the migration.

8. The system of claim 7, wherein the operations further comprise aborting the migration based on a received indication to abort the migration.

9. The system of claim 7, wherein the migrate start includes:
   assigning a VLAN to an ISID;
   continuing to use VLAN encapsulation;
   advertising a local machine to remote backbone edge bridges using the second protocol; and
   storing information about the advertised local machine in a second table of each remote backbone edge bridge.

10. The system of claim 7, wherein the migrate cutover includes:
    confirming that the second table includes machine addresses associated with an active session;
    encapsulating and forwarding messages according to the second protocol; and
    retaining NNI ports as part of a C-VLAN.

11. The system of claim 8, wherein the aborting includes:
    removing a VLAN to ISID mapping;
    retaining NNI ports as part of a C-VLAN;
    clearing the second table in each BEB; and
    encapsulating and forwarding messages in the first protocol.

12. The system of claim 7, wherein the completing includes:
    removing NNI ports from a C-VLAN;
    removing VLAN MAC entries by permitting the VLAN MAC entries to age-out; and
    encapsulating and forwarding traffic using the second protocol.

13. A nontransitory computer readable medium having stored thereon software instructions that, when executed by a processor, cause the processor to perform operations including:
    receiving, at a processor, an indication to initiate a migrate start;

initiating a migrate start including forwarding traffic in a first protocol based on a first table and building a second table to forward traffic in a second protocol different from the first protocol;

performing a migrate cutover when it is determined that one or more MAC addresses for an active session have been learned and stored in the second table; and completing a migration when an indication is received to complete the migration.

14. The nontransitory computer readable medium of claim 13, further comprising aborting the migration based on a received indication to abort the migration.

15. The nontransitory computer readable medium of claim 13, wherein the migrate start includes:

assigning a VLAN to an ISID;

continuing to use VLAN encapsulation;

advertising a local machine to remote backbone edge bridges using the second protocol; and storing information about the advertised local machine in each remote backbone edge bridge.

16. The nontransitory computer readable medium of claim 13, wherein the migrate cutover includes:

confirming that the second table includes machine addresses associated with an active session;

encapsulating and forwarding messages according to the second protocol; and retaining NNI ports as part of a C-VLAN.

17. The nontransitory computer readable medium of claim 14, wherein the aborting includes:

removing a VLAN to ISID mapping;

retaining NNI ports as part of a C-VLAN;

clearing the second table in each BEB; and encapsulating and forwarding messages in the first protocol.

18. The nontransitory computer readable medium of claim 13, wherein the completing includes:

removing NNI ports from a C-VLAN;

removing VLAN MAC entries by permitting the VLAN MAC entries to age-out; and encapsulating and forwarding traffic using the second protocol.

* * * * *